(12) United States Patent
Travers et al.

(10) Patent No.: US 6,636,359 B2
(45) Date of Patent: Oct. 21, 2003

(54) TWO STAGE OPTICAL MAGNIFICATION AND IMAGE CORRECTION SYSTEM

(75) Inventors: Paul Travers, Honeoye Falls, NY (US); Paul Churnetski, West Henrietta, NY (US); Lee Martin, Knoxville, TN (US)

(73) Assignee: Interactive Imaging Systems, Inc., Rochester, NY (US)

( * ) Notice: Subject to any disclaimer, the term of this patent is extended or adjusted under 35 U.S.C. 154(b) by 0 days.

(21) Appl. No.: 09/765,193

(22) Filed: Jan. 18, 2001

(65) Prior Publication Data

US 2001/0050817 A1 Dec. 13, 2001

Related U.S. Application Data

(63) Continuation-in-part of application No. 09/589,836, filed on Jun. 8, 2000, now Pat. No. 6,417,970.

(51) Int. Cl.[7] .............................................. G02B 27/14
(52) U.S. Cl. ....................... 359/631; 359/633; 359/638
(58) Field of Search ................................ 359/630, 631, 359/633, 637, 638, 639, 640; 345/7, 8

(56) References Cited

U.S. PATENT DOCUMENTS

| | | | | |
|---|---|---|---|---|
| 5,028,119 A | * | 7/1991 | Hegg et al. | 359/632 |
| 5,035,474 A | * | 7/1991 | Moss et al. | 359/13 |
| 5,044,709 A | * | 9/1991 | Smith et al. | 359/13 |
| 5,880,888 A | * | 3/1999 | Schoenmakers et al. | 359/631 |
| 5,886,822 A | * | 3/1999 | Spitzer | 359/630 |
| 5,991,084 A | * | 11/1999 | Hildebrand et al. | 359/629 |
| 6,055,110 A | * | 4/2000 | Kintz et al. | 359/637 |
| 6,130,784 A | * | 10/2000 | Takahashi | 359/630 |
| 2002/0034016 A1 | * | 3/2002 | Inoguchi et al. | 359/630 |

* cited by examiner

Primary Examiner—Ricky Mack
(74) Attorney, Agent, or Firm—Stephen B. Salai, Esq.; Donna P. Suchy, Esq.; Harter, Secrest & Emery LLP

(57) ABSTRACT

A display having a two-stage optical process is disclosed. This two-stage system enables a relatively compact and inexpensive display. A display screen projects an image that passes through a first lens or lens system. The collimated light is then diffused by one of several methods so as to increase the ultimate viewer's eyebox. The diffused image then undergoes a magnification process involving total internal reflection within a second lens. The light exiting the second lens is magnified to the level desired at a low cost and a small size.

24 Claims, 4 Drawing Sheets

TWO STAGE OPTICAL MAGNIFICATION AND IMAGE CORRECTION SYSTEM

This application is a continuation-in-part of application Ser. No. 09/589,836, filed Jun. 8, 2000, now U.S. Pat No. 6,417,970, for TWO STAGE OPTICAL SYSTEM FOR HEAD MOUNTED DISPLAY.

FIELD OF THE INVENTION

The present invention relates to an optical display system that may be used with head mounted or hand held display systems. More particularly, the invention relates to a two-stage optical system for this display system that comprises a first stage for magnification and image sizing and a second stage that includes a total internal reflection process.

BACKGROUND OF THE INVENTION

A real image refers to an image that is observed directly by the unaided human eye. A photograph is an example of a real image. Electronic displays that provide a real image generally provide some form of display surface on which the real image is formed and viewed. A real image can be observed by the unaided eye when a viewing surface is positioned at its location. Examples of electronic displays that provide real images include liquid crystal displays, CRT monitors, and projection screens.

In contrast with real images, a virtual image is an image that appears to be coming from a location where no real image exists. By definition, a virtual image can exist at a location where no display surface exists. The size of the virtual image therefore is not limited by the size of a display surface. An example of a virtual image is the image of fine print viewed through a magnifying glass. The print not only appears larger, but it also appears to be located substantially behind the surface where the print actually exists. Virtual image displays thus have the advantage of eliminating the need for a large display surface in order to provide a large image to the viewer.

Software and computer hardware for creating virtual images have improved steadily over time. However, generating sizable displays is expensive and greatly increases the cost of display devices. In order to provide a viewer with as complete a virtual reality experience as possible, the image he sees should fill his field of vision. The viewer must also be able to look around at his environment. In order to accomplish these goals, displays need to provide a virtual image to the viewer as opposed to a real image.

A virtual display must initially form a source image that is then rendered by an optical system to create the virtual image. A substantial advantage of a virtual electronic display is that the source image initially created may be as small as can be usefully reimaged by the optical system. As a result, virtual electronic display systems may effectively use very small displays to form the source image. Pixel sizes may be as small as a few microns in diameter. At this size, the unaided eye cannot resolve images. Rather, in order to view the source image formed by the display, substantial magnification of the optical system is required.

A virtual image must be created by an optical system of some kind. In a real image electronic display, it is the eye and the viewing surface properties that determine the viewing parameters. By contrast, in a virtual image display, the optical system determines most of the viewing parameters.

There are three important parameters relating to the ease of viewing the image associated with virtual image display systems. The first parameter is the eye relief. This refers to the maximum distance from the eye which the optical system can be held and have the eye still see the entire virtual image. Optical devices which provide a eye relief which is a short distance from the optic are undesirable due to the inconvenience and discomfort associated with placing the eye in close proximity with the optic. It is therefore preferred that an optic provide a long eye relief in order to enable the magnified image to be viewed through the optic at a comfortable and convenient range of distances from the optic.

The second parameter relating to the ease of viewing a virtual image is the apparent angular width of the virtual image, commonly referred to as the field of view of the virtual image. The full field of view is defined as the ratio of the largest apparent dimension of the virtual image to the apparent distance to the virtual image. It is generally equivalent to the field of view for a real image display surface.

The third parameter relating to the ease of viewing a virtual image is the transverse distance that the eye may move with respect to the optical system and still have the eye see the entire virtual image through the optical system. This is commonly referred to as the "eyebox." The size of the eyebox is determined by the eye relief and size of the exit pupil of the display system. The exit pupil is the place where the eye must be placed in order to see the whole image at once. A large exit pupil has been found to be one of the most important factors in determining viewing comfort by nearly all users we have tested. A large exit pupil and eyebox will also accommodate the range of pupil motion needed as the eyeballs rotate to scan through the viewing angle of the image, as well as to accommodate the variation in the interpupillary distance among the user population.

A need currently exists for an inexpensive, compact, virtual image display system that can be used in a hand held or head mounted apparatus that provides a virtual image that is positionable within a small volume and has a large exit pupil and eye relief and uses small displays.

It is recognized that one of the primary factors driving up the cost of virtual reality display systems is the cost of the initial display. Prior art display systems have been created that use small displays coupled to magnification systems. These generate the larger virtual images the viewer sees. However, prior art magnification processes are bulky and can make head mounted or handheld display systems unwieldy and cumbersome. Also, these display systems do not work as well with handheld devices.

Therefore, the need exists for a lightweight display system that operably presents a visual display occupying all or almost all of the viewer's field of vision to a wearer that is both comfortable and relatively inexpensive.

Further, video images are recorded with various aspect ratios, e.g., 4:3 and 16:9. The display screen showing the unmagnified video image will necessarily have fixed dimensions. Therefore, for all images with aspect ratios that do not match the fixed dimensions of the display screen, there will be distortion in either the height or the width of the image dependent upon the relation between the aspect ratio of the image and that of the display. It would be an improvement if the image could be adjusted so that it appears undistorted to a viewer.

SUMMARY OF THE INVENTION

An object of the invention is to create a display system that is lightweight, convenient, and relatively inexpensive.

This and other objects of the invention are accomplished by a display system having a two-stage optical system where the second stage magnification is accomplished using total internal reflection techniques. This two-stage system is usable in relatively compact and inexpensive display systems. In a preferred embodiment, the head-mounted display system has two sections extending rearward around the sides of the head. Within each section, a display screen projects an image that passes through a first lens that adjusts the size of the image. It can magnify the image, alter the aspect ratio of the image, or both. The image then undergoes total internal reflection within a subsequent lens, resulting in magnification of the image. The viewer is presented with a virtual image many times larger than the original display.

DETAILED DESCRIPTION OF THE PREFERRED EMBODIMENTS

Figure 1:
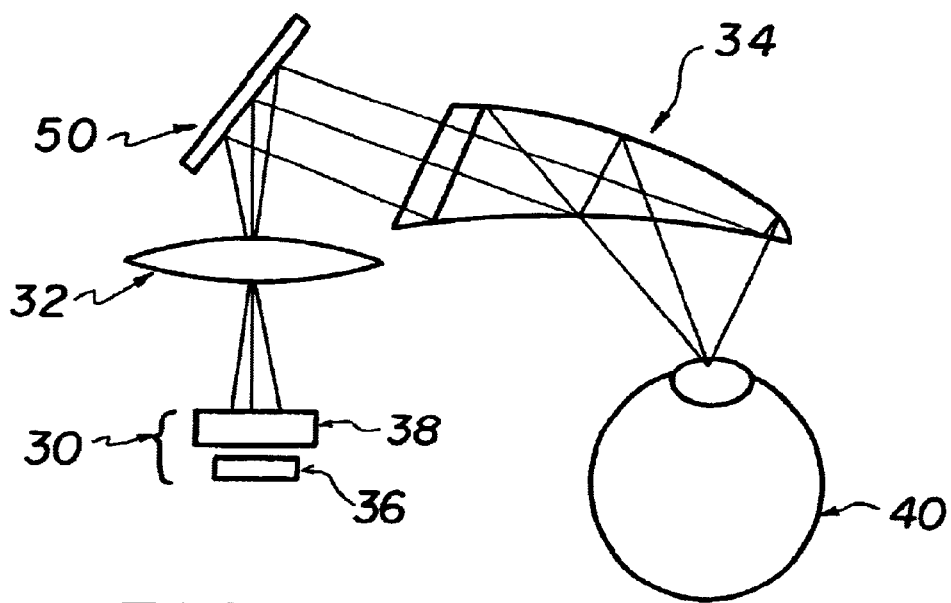
FIG. 1 is a schematic illustration of a first preferred embodiment of the two-stage process.

FIG. 1 is an illustration of the magnification process used for this invention. It includes a display 30, a first magnifier 32 and a totally internally reflecting (TIR) lens 34. Light rays emitted by a generated image can be seen traveling through the system and ultimately being received by a viewer's eyeball 40.

The image to be magnified originates on the display screen 30, which will generally have a screen size of 0.5" diagonally. As technology improves smaller and smaller screen displays may be used with this invention. Displays with 0.5" diagonals or less are much cheaper than 1" or 2" displays. There are three basic types of displays: (1) self-illuminating or emissive, such as OLEDs or FEDs, (2) back lit or transmissive, such as AMLCDs, or (3) front lit or reflective, such as LCOS displays.

Figure 2:
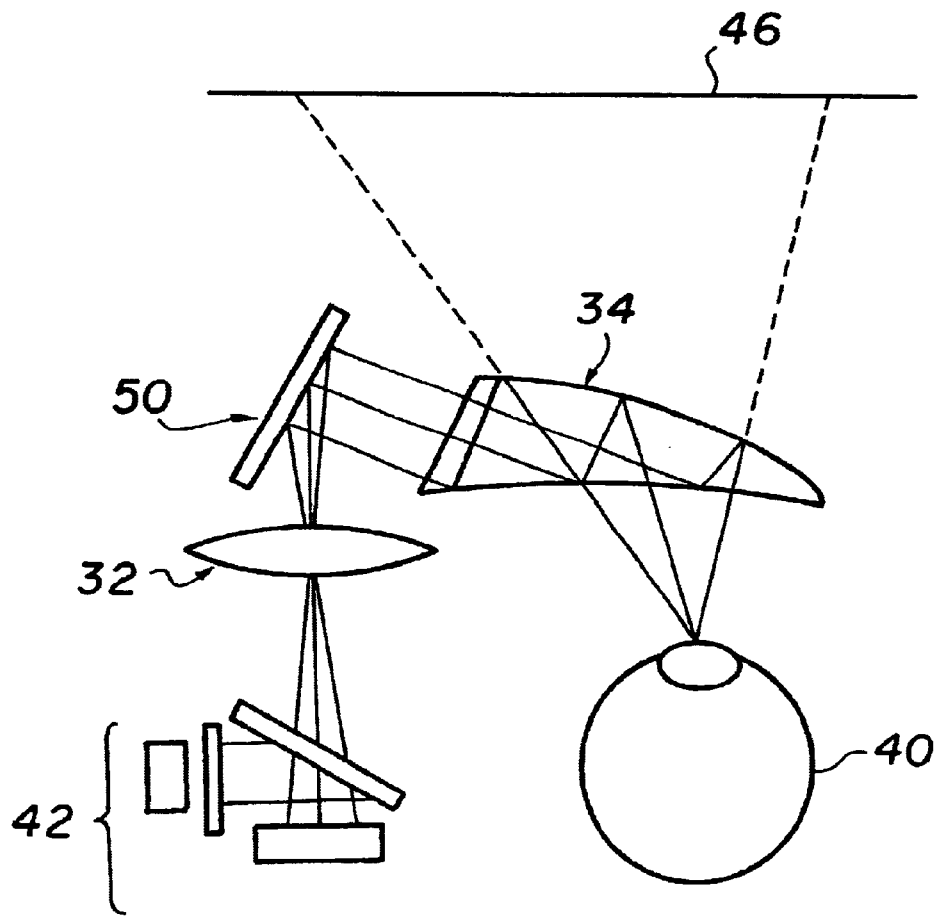
FIG. 2 is a schematic illustration of a second preferred embodiment of the two-stage process.

The screen used in our preferred embodiment is a transmissive display. A first stage optical system 32 is placed in the path of the light being projected from the display. We have primarily used transmissive displays such as that illustrated in FIG. 1. Light source 36 illuminates the screen 38. FIG. 2 illustrates the magnification system where a reflective display 42 is used.

The first stage magnification process is an optical system designed to simply enlarge the image. The first stage magnification process may take the form of a single lens such as a simple aspherical convex lens or it could take the form of a series of lenses. For the sake of simplicity, the first stage magnification optic will be referred to as an effective lens 32. It will be understood that effective lens refers to the one or more lenses constituting the first stage. The effective lens 32 projects a magnified, collimated image onward to the second stage. The effective lens enlarges the projection enough so that when the beam passes through the TIR lens, it fills the viewer's field of vision. Light also leaves the first stage at a predetermined angle chosen so that the beam will undergo total internal reflection before leaving the TIR lens 34.

In addition to magnifying the image, the effective lens 32 may also alter or correct the aspect ratio of the display. A lens or multiple lenses can be designed so as to alter the size of the image in the vertical and horizontal directions by different amounts. For instance, a 16:9 (width by height) image could be displayed on a 4:3 screen so that it fills the entire screen. This would cause the image on the screen to appear stretched and distorted. To eliminate that distortion the effective lens may be used to increase the width of the image, decrease the height of the image, or increase both in such a manner that the width is increased by more than the height. This would allow for the use of all the pixel elements, eliminating the letterbox effect and having a higher resolution image. To accomplish a greater magnification to the width than to the height of an image, a single lens would have to have a greater curvature along a vertical axis rather than the horizontal axis.

A mirror 50 is positioned between the first stage and the second stage of the magnification process. The image projected from the first stage magnification process is reflected by the mirror into the TIR lens 34. This kind of mirror is known as a folding mirror. The mirror may also have some corrective features because it is unlikely that the TIR lens will be flawless. The mirror can be designed to compensate for these flaws.

Figure 4:
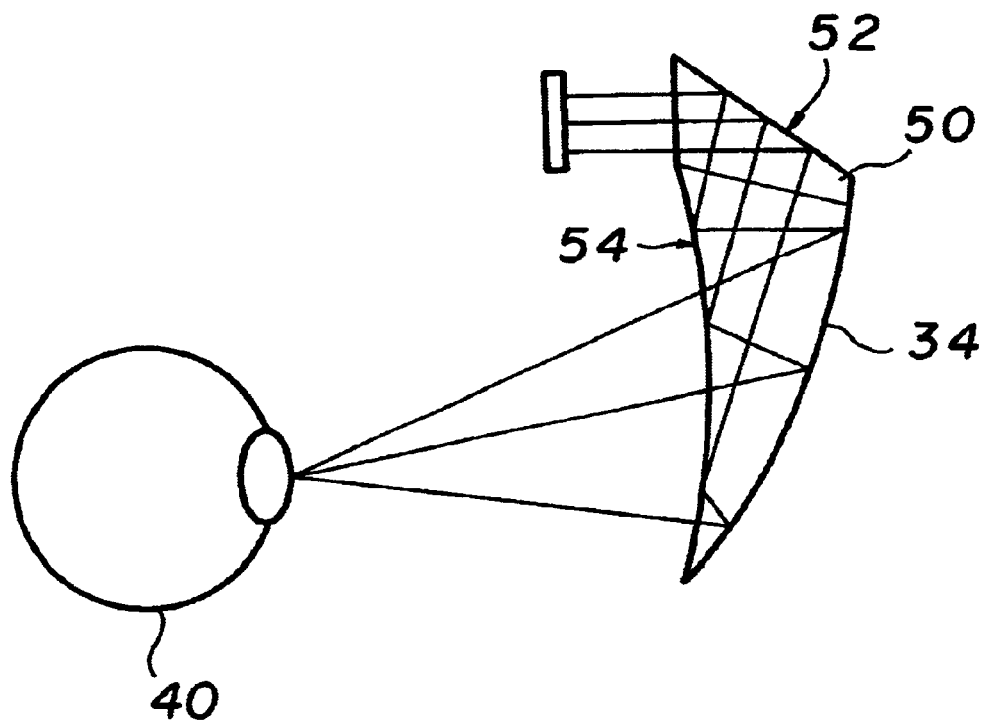
FIG. 4 is a schematic illustration of a TIR lens incorporating a folding mirror integrally along the leading edge.

The mirror 50 may also be integral with the TIR lens 34. See FIG. 4. Incoming images pass through the base normal to the surface, so as to eliminate reflection. The mirror lies along surface 52 of the TIR lens and reflects the light onto surface 54 of the lens.

Figure 3:
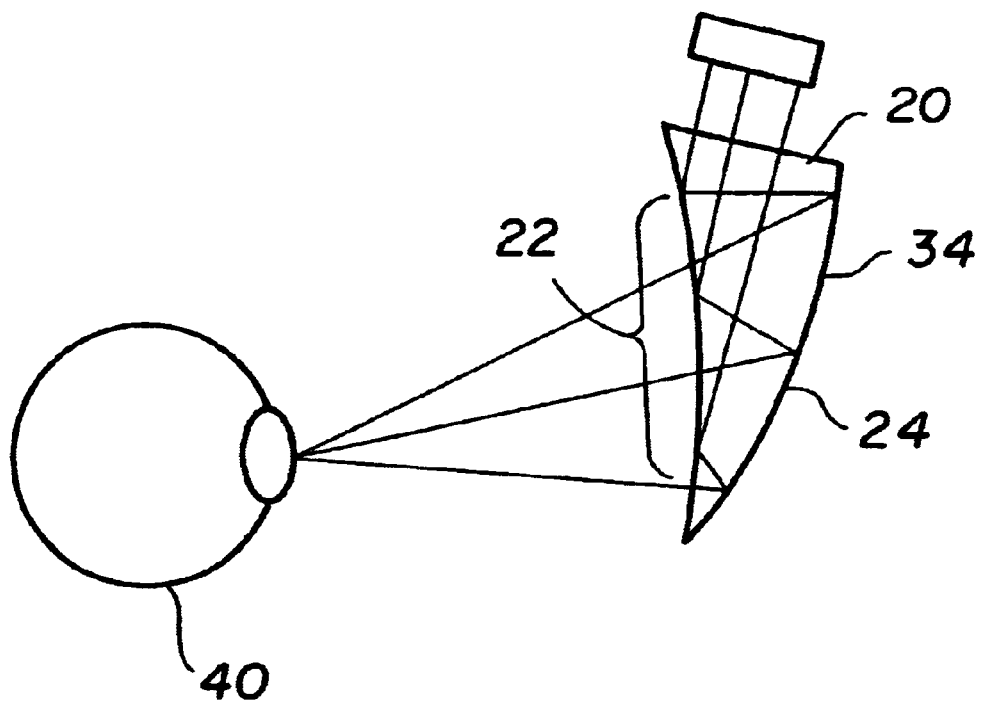
FIG. 3 is an illustration of a lens used for total internal reflection.

The TIR lens 34 is shown in FIG. 3. In general, the TIR lens is composed of a dielectric having a higher index of refraction than air. It has a small area inlet port 20, and a large area exit port 22. The wall of the lens furthest from the viewer 24 is coating with a reflective material. Various Aluminum compounds work well and are commonly used. The inlet port 20 is located in front of the beam leaving the first stage lens. The large area exit port 22 faces towards a downstream viewing area. The TIR is defined by two curved walls, the walls having different radii of curvature.

Figure 8A:
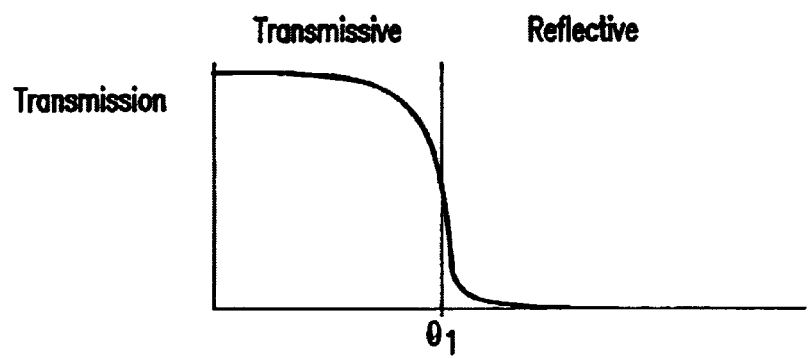
FIG. 8A shows a plot of transmission as a function of the angle of incidence for light passing from air into a TIR lens.
Figure 8B:
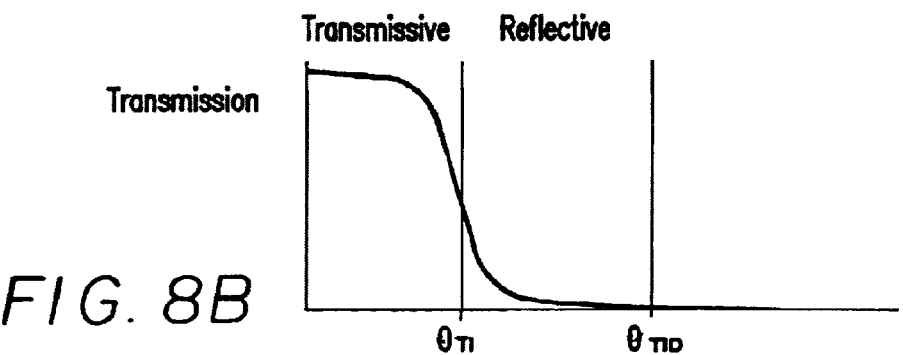
FIG. 8B shows a plot of transmission as a function of the angle of incidence for light passing from a TIR lens into air.

A TIR lens has the property that the inner surface is reflective to light above a certain angle of incidence, $\theta_i$ with respect to the normal to the surface at that point, and transmissive below $\theta_i$. FIG. 8A shows a plot of transmission as a function of the angle of incidence for light passing from air into the TIR lens. FIG. 8B shows transmission as a function of the angle of incidence for light passing from within the first magnification optic into air. In FIG. 8B, the angle at which total internal reflection occurs is shown for angles greater than the angle of total internal reflection, $\theta_{TIR}$. The angle of total internal reflection for a material can be calculated using the formula $\theta_{TIR}=\sin^{-1}(1/n)$, where n is the index of refraction of the material. The angle corresponding to $\theta_i$ on FIG. 8A and $\theta_{i1}$ on FIG. 8B can be calculated using Snell's Law. The relationship is $\sin(\theta_i)=n*\sin(\theta_{i1})$, where n is the index of refraction of the material forming the compound optical element. As a result, light forming the magnified virtual image projected toward the inner surface of the exit port at an angle ($\theta_{MVI}$) that is smaller than $\theta_{i1}$ is transmitted by the surface, while light from a source object projected toward the inner surface of the exit port at an angle ($\theta_{SO}$) that is greater than $\theta_{i1}$ is reflected back internally. The internally reflected light then reflects off the back wall of the TIR, which is coated with a reflective substance. The light then goes out the exit port. The increased distance that the light travels within the lens increases the amount of refraction each light ray undergoes before exiting.

Because of the curvature of the walls of the TIR lens, and because different elements of the projected image are spread out over a finite distance, the different elements of the display image follow diverging paths and spread apart as they pass through the TIR lens. Because of this divergence, when the beams exit the TIR lens and travel onward towards the viewer's eyes, the viewer perceives a much larger virtual image. The exact magnification depends upon the exact shape of the lens and the angle of penetration of the beam from the first stage lens. The magnification process is illustrated best in FIG. 2 by the increased spacing between the light rays exiting the exit port. Spatial plane 46 is where the viewer perceives the image to be. The angular spread of the light striking the viewer's eyeball 40 is what causes the viewer to perceive the larger more distant figure.

The relative distances separating the display, the first lens, and the TIR lens 34, depend upon the initial display size, the amount of magnification desired, the aspect ratio of the image, the relative dimensions of the display screen, the size and shape of the first lens, and the size and shape of the TIR lens.

Figure 5:
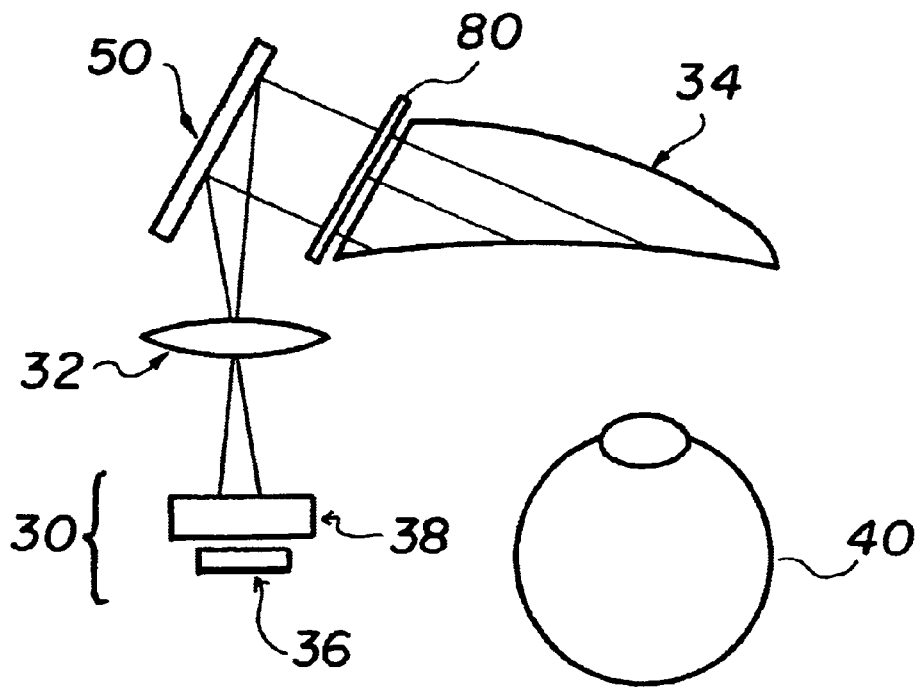
FIG. 5 is an illustration of a third preferred embodiment of the two-stage process using a projection element between the first and second stages of the process.

FIG. 5 illustrates another embodiment of the two stage optical system. In this embodiment a diffuser has been located in front of the TIR lens. This is sometimes necessary because the incident image will often be highly collimated after passing through the first stage magnification process. When a ray of light impinges on a diffuser, the diffuser emits a cone of rays corresponding to the incoming ray. The angular spread of this cone is determined by the characteristics of the particular diffuser. Because the spread of the cone is only dependent upon the particular diffuser used, each collimated ray of light produces a cone of rays with the same spread as every other collimated ray of light. This allows that the viewer to see the entire image from a variety of angles. After passing through the diffuser, the refraction caused by passage through the TIR lens increases the viewer's eyebox even further.

Figure 6:
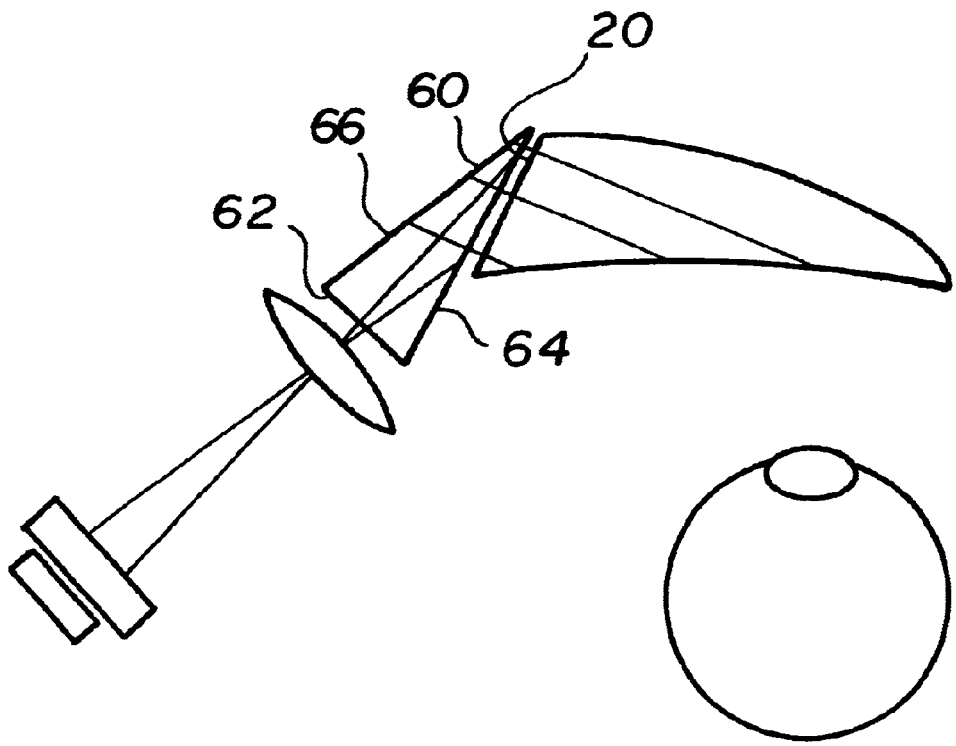
FIG. 6 is an illustration of a fourth preferred embodiment of the two-stage process.

Another embodiment of the invention is shown in FIG. 6. In this embodiment a prism 60 is placed in front of the TIR lens. The cross-section of the prism is a triangle. In a preferred embodiment, the triangle is a 30°–60°–90° triangle. It can actually have a variety of dimensions. It just has to be shaped and positioned so that light reflects off wall 66. For the particular embodiment using a 30°–60°–90° triangle, the hypotenuse of this triangle should be parallel with the inlet port 20 of the TIR lens. However this also does not have to be the case. A right triangle is not required, so there may not even be a hypotenuse. Again the size, shape, and position of the prism are interdependent parameters and if one is adjusted, the others need to be adjusted as well.

Light exiting the first stage of the magnification process, enters through a side of the prism. In the embodiment shown in FIG. 6, this is side 62, the side of the prism opposite the 30-degree angle. Incoming light internally reflects off of the front wall 64 of the prism and strikes the rear wall 66 of the prism 60. The rear wall 66 of the prism is coated with a projection diffusing coating. It is important to stress that this particular path for incoming light is not required. If the prism had a different configuration the light path could and would be different. The important element is that light traveling through the optical system must reflect off the prism wall having the projection screen. Similar to the effect caused by the diffuser, for each light ray impinging the rear wall 66, a cone of rays is emitted from the rear wall 66 of the prism. This creates a greater range of directions in which the image is being sent. The light exits through the front side of the prism and enters the TIR lens. The increased range of directions entering the TIR lens leads to a much larger eyebox for the viewer.

The coating used on the rear wall of the prism is preferably white, because white gives a flat response across the color spectrum. The angular spread of the reflected image is dependent upon which coating is used. Angular spreads of between 5° and 120° are possible. For the embodiment disclosed here, i.e., including a 30°–60°–90° prism positioned as described, it was found that a 90° spread gave the largest eyebox without wasting any light rays of the reflected image. Use of a prism having a different size, shape, or position might require different angular spreads. If the angular spread is too large, the cone of rays for some elements of the image will extend past the edge of the TIR lens. Munsell White Reflectance Coating, a barium sulfate mixture, was found to work very well.

Figure 7:
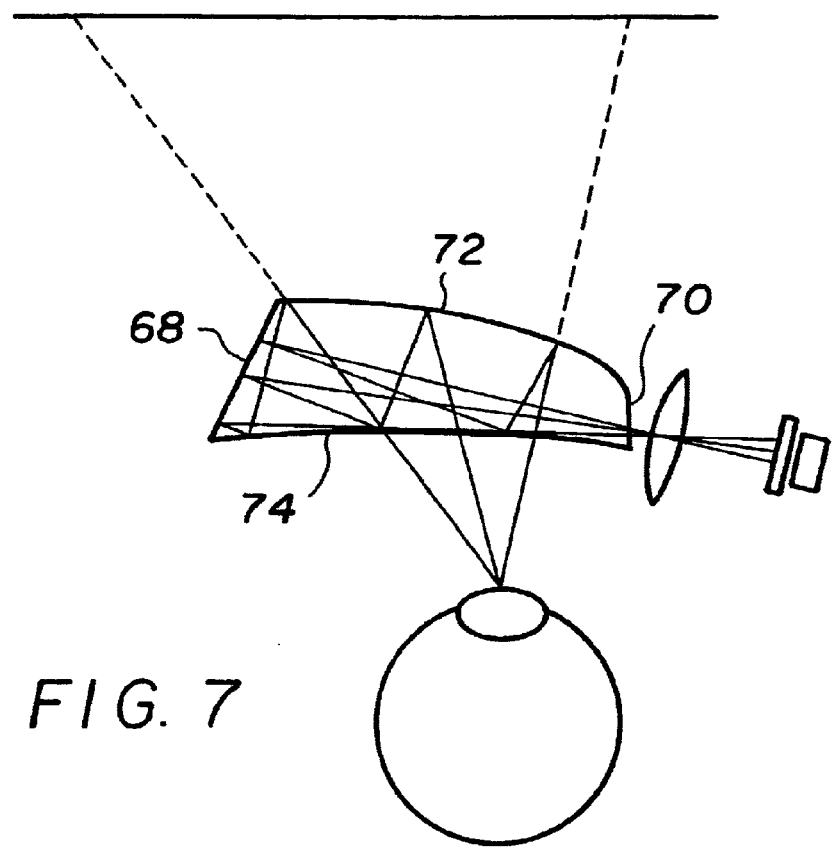
FIG. 7 is an illustration of a fifth preferred embodiment of the two-stage process.

Yet another embodiment is shown in FIG. 7. This embodiment does away with a separate prism. This embodiment includes a reflective white projection screen 68 incorporated into the TIR lens. Light enters through one end of the lens 70. It enters at an angle such that the light passes through the lens and contacts the opposite wall of the TIR lens incorporating the projection screen 68. In response the projection screen emits a cone of rays. These light rays strike the inside surface of the large area exit port 74 at an angle greater than $\theta_{TIR}$ with respect to a normal to the surface. The internally reflected light then reflects off the back wall 72 of the TIR, which is coated with a reflective aluminum compound. The light then goes out the exit port of the TIR lens. Again the cone of rays leads to a much larger eyebox for the viewer.

While preferred embodiments of the invention have been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed:

1. A two-stage display system, comprising:
   (a) a display;
   (b) a first stage aspect ratio correcting optical system, optically connected to the display;
   (c) a second stage optical system optically connected to the first system, where the second system includes a lens; and
   (d) the second system lens is a lens in which at least a portion of the incoming light is totally internally reflected.

2. The display system of claim 1, wherein the display comprises one of a self-illuminating display, a back lit display, and a front lit display.

3. The display system of claim 1, where the first stage optical system comprises a double convex lens.

4. The display system of claim 1, where the first stage optical system comprises an aspherical lens.

5. The display system of claim 1, where the first stage optical system comprises a compound lens.

6. The display system of claim 1, where the first stage optical system comprises multiple lenses.

7. The display system of claim 1, where the first optical system magnifies the display image.

8. The display system of claim 1, where the second optical system magnifies the display image.

9. The display system of claim 1, further comprising a diffuser optically connected to the first and second optical systems to create a larger eyebox for the viewer.

10. A two-stage display system, comprising:
    (a) a display;
    (b) a first magnification optical system optically connected to the display to magnify the display image;
    (c) a second magnification optical system optically connected to the first magnification optical system, where the second system includes a lens having a projection screen along one wall; and
    in which lens at least a portion of the incoming light is totally internally reflected by the lens.

11. The display system of claim 10, further comprising a diffuser optically connected between the first and second optical systems.

12. A two-stage display system, comprising:
    (a) a display;
    (b) a first magnification optical system optically connected to the display to magnify the display image;
    (c) a prism optically connected to the first optical system; and
    (d) a second magnification optical system optically connected to the prism, where the second system includes a lens in which at least a portion of the incoming light is totally internally reflected (TIR).

13. The display system of claim 12, where one side of the prism is coated with a projection diffusing substance.

14. The display system of claim 13, where the projection diffusing substance is a barium sulfate compound.

15. The display system of claim 12, further comprising a mirror optically connected to the first and second optical systems to fold the light into the TIR lens.

16. The display system of claim 15, where the mirror is attached to the TIR lens.

17. A two-stage display system, comprising:
    (a) a display;
    (b) a first magnification optical system optically connected to the display to magnify the display image;
    (c) a second magnification optical system, including a lens having a projection screen along one wall, optically connected to the first magnification optical system.

18. A two-stage display system, comprising:
    (a) a display;
    (b) a first magnification optical system optically connected to the display to magnify the display image;
    (c) a prism optically connected to the first optical system where one side of the prism is coated in a projection diffusing substance; and
    (d) a second magnification optical system optically connected to the prism, where the second system includes a lens.

19. The display system of claim 18, where the projection diffusing substance is a barium sulfate compound.

20. The display system of claim 18, further comprising a mirror optically connected to the first and second optical systems to fold the light into the lens.

21. The display system of claim 20, where the mirror is attached to the lens.

22. The display system of claim 18, further comprising a diffuser optically connected between the first and second optical systems.

23. A two-stage display system, comprising:
    (a) a display;
    (b) a first optical system optically connected to the display;
    (c) a second optical system, including a lens having a projection screen along one wall in which at least a portion of the incoming light is totally internally reflected by the lens, optically connected to the first optical system.

24. A two-stage display system, comprising:
    (a) a display;
    (b) a first optical system optically connected to the display;
    (c) a prism optically connected to the first optical systems; and
    (d) a second optical system including a lens, in which at least a portion of the incoming light is totally internally reflected by the lens, optically connected to the prism.

* * * * *